(No Model.)
S. L. VREELAND.
TRAY.
No. 276,510. Patented Apr. 24, 1883.
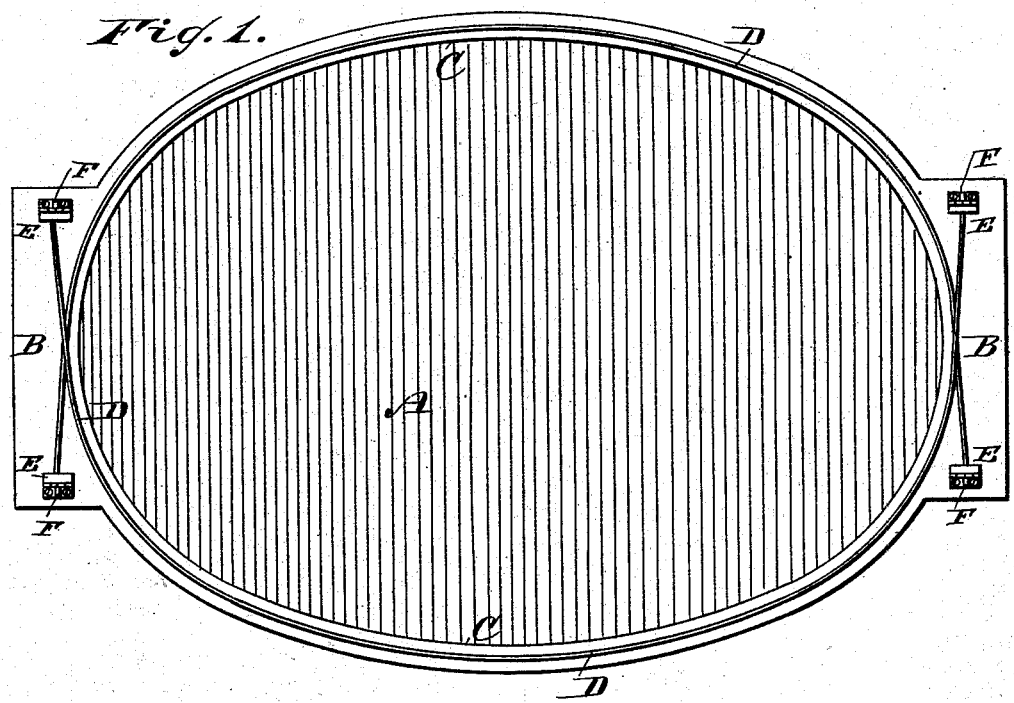
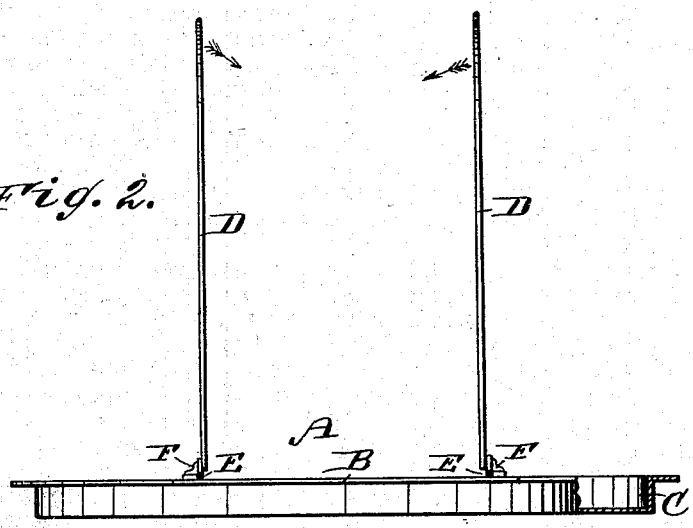
WITNESSES:
Theo. G. Hoster
C. Sedgwick
INVENTOR:
S. L. Vreeland
BY Munn & Co.
ATTORNEYS.

UNITED STATES PATENT OFFICE.

SARA L. VREELAND, OF HACKENSACK, NEW JERSEY.

TRAY.

SPECIFICATION forming part of Letters Patent No. 276,510, dated April 24, 1883.

Application filed March 16, 1883. (No model.)

*To all whom it may concern:*

Be it known that I, SARA L. VREELAND, of Hackensack, in the county of Bergen and State of New Jersey, have invented a new and Improved Tray, of which the following is a full, clear, and exact description.

The object of my invention is to provide a new and improved tray on which articles can be carried very conveniently without danger of their sliding off, and without requiring the use of both hands while carrying the tray.

The invention consists in an oval or circular tray provided with wings, to which handles or bails are hinged, which handles or bails are curved in such a manner that when they are folded down they rest on the rim of the tray. The hinges of the bails or handles are provided with stops, to prevent swinging them upward or outward too far beyond the vertical position.

Reference is to be had to the accompanying drawings, forming part of this specification, in which similar letters of reference indicate corresponding parts in all the figures.

Figure 1 is a plan view of my improved tray, showing the handles folded down. Fig. 2 is an end elevation of the same, parts being broken out and shown in section, and the handles being shown raised.

The tray A is made oval, with straight wings B at the ends. The tray is recessed, so that a raised flanged rim, C, will be formed at the edges, the flanges being flush with the wings B. At the ends of each wing the end of a curved or bow-shaped handle or bail, D, is hinged, the said handles being parallel with the longitudinal axis of the tray. The handles or bails are curved in such a manner that when folded down on the tray they will rest on the flange of the rim C. The hinges E of the handles D are provided with stops F, which prevent the handles from being raised or swung in the inverse direction of the arrows too far beyond the vertical position, as shown. While carrying the tray the highest points of the handles or bails are to be swung in contact, so that the tray can be carried and held by one hand, leaving the other free to open doors, &c. The rim prevents the dishes and other articles on the tray from sliding off in case the tray is accidentally inclined. The tray can be used in dining-rooms, sick-rooms, &c. When the handles or bails are swung down they cross each other. The recess of the tray is to be about one inch deep—that is, the rim is about one inch high. In place of making the tray oval, it can be made circular; but the oval shape is preferable.

Having thus fully described my invention, I claim as new and desire to secure by Letters Patent—

1. A circular or oval tray provided with wings on which handles or bails are hinged, substantially as herein shown and described, and for the purpose set forth.

2. A circular or oval tray having wings at the ends, combined with curved or bow-shaped handles or bails hinged to the wings, which handles or bails are curved in such a manner that, when folded, they will rest on the edge of the tray, substantially as herein shown and described, and for the purpose set forth.

3. A circular or oval tray having wings at the ends, combined with bails or prongs hinged on the wings, and with stops on the hinges, to prevent swinging the bails or handles upward and outward too far beyond a vertical position, substantially as herein shown and described, and for the purpose set forth.

4. A circular or oval tray having a raised rim and wings flush with the rim, and circular or bow-shaped handles hinged to the wings, substantially as herein shown and described, and for the purpose set forth.

SARA L. VREELAND.

Witnesses:
 JAMES M. VAN VALEN,
 C. W. BERDAN.